US008144849B2

(12) United States Patent
Chu

(10) Patent No.: US 8,144,849 B2
(45) Date of Patent: Mar. 27, 2012

(54) SELECTIVE PRE-AUTHORIZED CREDIT FOR INCOMING CALLS

(75) Inventor: Lon-Chan Chu, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1137 days.

(21) Appl. No.: 11/957,138

(22) Filed: Dec. 14, 2007

(65) Prior Publication Data
US 2009/0154674 A1 Jun. 18, 2009

(51) Int. Cl.
*H04M 15/10* (2006.01)
*G10L 15/26* (2006.01)

(52) U.S. Cl. ... 379/114.2; 340/7.1; 370/352; 379/88.22; 379/211.03; 379/220.01; 379/221.14; 379/224; 455/406; 455/419; 455/432.1; 704/244; 704/270; 705/2

(58) Field of Classification Search ............... 370/352; 379/114.2, 220.01, 224, 88.22, 114.02, 221.14; 455/406, 419, 432.1; 340/7.1; 704/244, 704/270; 705/2
See application file for complete search history.

(56) References Cited

U.S. PATENT DOCUMENTS

| | | | | |
|---|---|---|---|---|
| 5,127,040 | A * | 6/1992 | D'Avello et al. | 455/419 |
| 5,553,124 | A * | 9/1996 | Brinskele | 379/114.02 |
| 5,793,859 | A * | 8/1998 | Matthews | 379/211.03 |
| 6,353,730 | B1 * | 3/2002 | Buettner et al. | 340/7.1 |
| 6,529,596 | B1 * | 3/2003 | Asprey et al. | 379/224 |
| 6,574,328 | B1 * | 6/2003 | Wood et al. | 379/224 |
| 6,618,703 | B1 * | 9/2003 | Peres et al. | 704/270 |
| 6,731,625 | B1 | 5/2004 | Eastep et al. | |
| 6,944,166 | B1 | 9/2005 | Perinpanathan et al. | |
| 7,043,001 | B2 * | 5/2006 | Moisey et al. | 379/221.14 |
| 7,333,796 | B2 * | 2/2008 | Scalisi et al. | 455/406 |
| 7,545,918 | B2 * | 6/2009 | Edwards | 379/88.22 |
| 7,720,681 | B2 * | 5/2010 | Milstein et al. | 704/244 |
| 7,764,777 | B2 * | 7/2010 | Wood et al. | 379/220.01 |
| 2004/0192297 | A1 * | 9/2004 | Erskine et al. | 455/432.1 |
| 2005/0030938 | A1 * | 2/2005 | Barr | 370/352 |
| 2005/0180404 | A1 | 8/2005 | Kwon | |
| 2005/0201364 | A1 | 9/2005 | Dalton, Jr. et al. | |
| 2006/0004641 | A1 * | 1/2006 | Moore et al. | 705/26 |
| 2006/0023644 | A1 | 2/2006 | Jang et al. | |

(Continued)

OTHER PUBLICATIONS

Unknown, "Communication Management for Every Enterprise," available at http://www.telecost.com/blog/archive/2007_02_01_archive.html, Feb. 26, 2007, 22 pages.

Unknown, "New Voice and Telephony Features in Cisco IOS Release 12.4T," available at http://www.cisco.com/univercd/cc/td/doc/products/software/ios124/124newft/124t/124t2/vclftr4t.pdf, 2005, 47 pages.

(Continued)

*Primary Examiner* — Gerald Gauthier

(74) *Attorney, Agent, or Firm* — Senniger Powers LLP

(57) ABSTRACT

Establishing a connection from a caller to a user using a pre-authorized credit from the user is described. A processor identifies one or more source identifications (IDs) for receiving pre-authorized credit for the incoming call. One or more destinations are specified to receive the incoming call. The processor defines a rule associated with the one or more destinations and the one or more source IDs. An interface receives the incoming call directed to one of the destinations from the caller. A storage area stores the defined rule. The incoming call and the caller are determined as a function of the one of the destinations, one or more identified source IDs and the defined rule. The pre-authorized credit is issued for the incoming call from the caller if it is determined that the incoming call to the destination satisfies the defined rule. The processor routes the incoming call to the user.

19 Claims, 3 Drawing Sheets

U.S. PATENT DOCUMENTS

2006/0043164 A1 3/2006 Dowling et al.
2006/0271600 A1* 11/2006 Goh et al. .................... 707/201
2007/0094712 A1 4/2007 Gibbs et al.
2008/0172459 A1 7/2008 Cross et al.
2009/0154674 A1* 6/2009 Chu .......................... 379/114.2

OTHER PUBLICATIONS

Unknown, "Business made easy," Product brief: Service Provider Enhanced Services Using the Nortel MPS 1000 Platform, available at http://www.nortel.com/products/04/mps/collateral/nn120741.pdf, 2007, 9 pages, Nortel, USA.

* cited by examiner

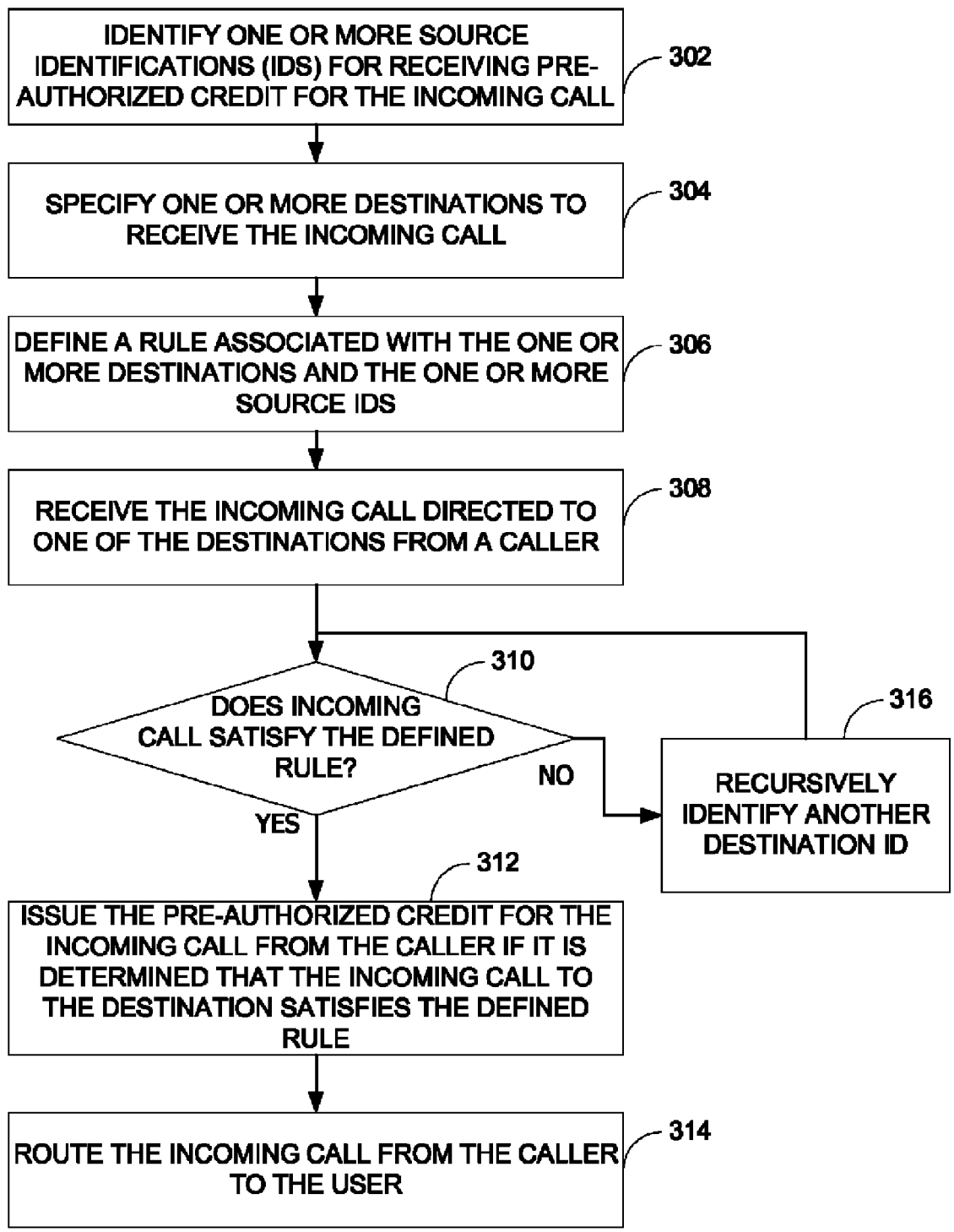

SELECTIVE PRE-AUTHORIZED CREDIT FOR INCOMING CALLS

BACKGROUND

Technological advances in computer networks not only improve textual information exchange but also open a new avenue for voice communication. Traditional telephone communication networks are no longer sole providers of quality voice data services. As networking technologies improve, an emerging Voice over Internet Protocol (VoIP) becomes a cost-effective alternative to make a phone call, compared to landline and mobile phone call. A VoIP call is typically initiated by or terminated to a VoIP device, such as a personal computer (PC), Wi-Fi phone, or session initiation protocol (SIP) Phone.

Currently, a VoIP call directed to or terminated at a regular landline or mobile phone is normally paid by a caller (i.e., a calling party). If the callee (i.e., called party) is a merchant who is willing to pay for the VoIP call, the so-called Merchant Powered Click-to-Call (MPC) allows a caller to call a merchant for free. This normally happens at search web sites. A significant usability disadvantage in this mechanism is that it requires a special mapping from a code name to a real phone number in the backend server; as a result, the user won't directly know the real phone number. Moreover, the user must always make a call from the same web site to enjoy a free call (or receive pre-authorized credit for the call).

SUMMARY

Embodiments of the invention overcome the shortfalls of prior practices by selectively issuing from a user or a callee to a caller a pre-authorized credit for an incoming call based on VoIP. Aspects of the invention enable evaluation of a source identification (ID) for identifying the caller and determine whether the source ID should receive the pre-authorized credit from the user based on a set of rules. If a call destination intended by the VoIP call is determined not to receive the pre-authorized credit, alternative embodiments of the invention may recursively search for another destination, based on the rules, for the VoIP call to receive the pre-authorized credit. A further alternative embodiment notifies the caller whether the caller wishes to proceed with the call if it is determined that the caller will not receive the pre-authorized credit.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Other features will be in part apparent and in part pointed out hereinafter.

BRIEF DESCRIPTION OF THE DRAWINGS

FIG. 3 is an exemplary flow chart illustrating operation of selectively issuing a pre-authorized credit to an incoming call according to an embodiment of the invention.

Corresponding reference characters indicate corresponding parts throughout the drawings.

DETAILED DESCRIPTION

Aspects of the invention provide automatic issuance of pre-authorized credit to calls, especially VoIP calls, to a user. In one example, the user may be a merchant, a business, an individual or the like. Aspects of the invention provide convenience to callers who would not have otherwise received free calls paid by the user under the current implementations.

Figure 1:
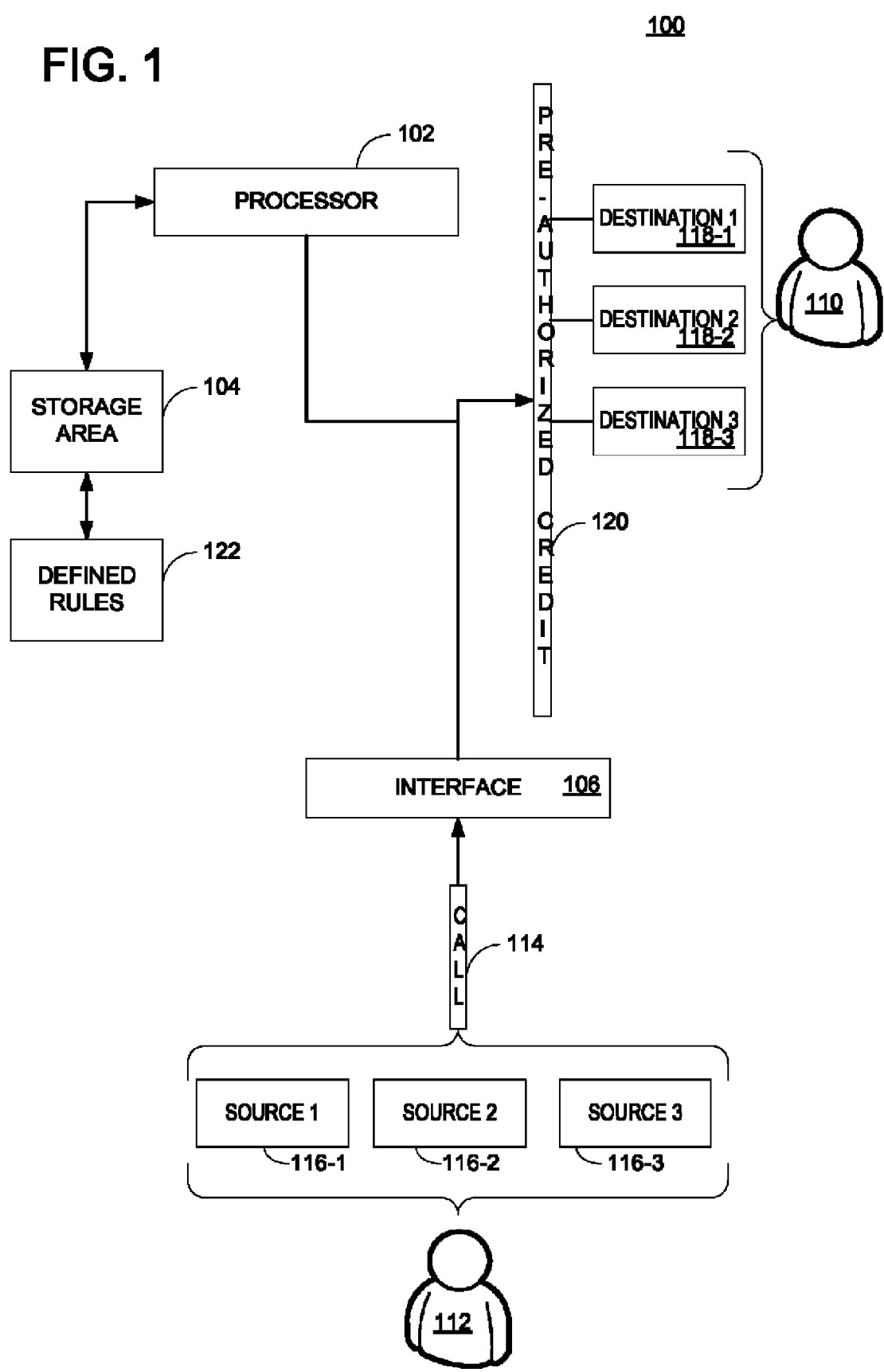
FIG. 1 is a block diagram illustrating an exemplary embodiment of a system for selectively issuing a pre-authorized credit to an incoming call according to an embodiment of the invention.

Referring now to FIG. 1, a diagram illustrates a system 100 for selectively issuing a pre-authorized credit for an incoming call to a user according to an embodiment of the invention. The system 100 includes a processor 102, a storage area 104 and an interface 106. The processor 102 may be a processing unit, a microprocessor, or a collection of processing units or microprocessors. The storage area 104 may be a computer-readable medium, either volatile or non-volatile, or computer-readable media for storing data for the processor 102. The interface 106 includes common input/output interfaces, such as user interface (UI), a system bus, a network interface, or the like. In one embodiment, the system 100 may be part of a cluster of computing devices or computer servers that provide one or more services to a user 110 and a caller 112. In addition, other systems or servers may be added to or work in conjunction with the system 100 without departing from the scope or the spirit of the invention. For example, an authentication server, a web server, a database server, or the like may supplement the system 100.

As previously described, aspects of the invention may be useful in situations the user 110 wishes to pay for the incoming calls. It is known that the user 110 may purchase a so-called toll free numbers (e.g., area code 800, 866, or 877) for potential customers. However, these toll free numbers are only free to calls originated from landline phones. Cellular phone calls or VoIP calls continue to pay for calls to these numbers by the caller 112.

As a further example, a family member may wish to enable free calls from other members in the family. For example, a father may wish to establish a way so that everyone in the family can call him at his work or his cell phone for free from any originating device. As such, embodiments of the invention provide this convenience by evaluating source identifications (IDs) of an incoming call against a set of defined rules to determine whether a given incoming call should receive a pre-authorized credit for the call.

To further illustrating embodiments of the invention, suppose the caller 112 wishes to place an incoming call 114 to the user 110. In one example, the caller 112 initiates the call 114 from one of the source IDs 116. For example, the source ID 116 may be a cell phone 116-1, a work phone 116-2, or an online ID 116-3. For example, the online ID 116-3 may be an e-mail address.

Before the call 114 of the caller 112 reaches the user 110, the user 110 may employ the system 100 to identify one of the source IDs the user 110 wishes to be covered by the pre-authorized credit 120. In this illustration, the user 110 may identify the source IDs 116 as one of the sources of the call. Furthermore, the user 110 may also wish to specify one or more destinations to which the call is directed. For example, the user 110 may specify destinations 118, such as a work phone 118-1, a cell phone 118-2, and a home phone 118-3 to receive the pre-authorized credit 120.

Next, the user 110 may define a rule 122 or a set of rules to selectively issue the pre-authorized credit 120 to incoming calls. In one example, the user 110 may establish or define one or more parameters in the rule 122, such as whether an incoming call is allowed, what type of call (domestic or international call) is allowed, and the maximum duration of a collect call is allowed, and/or the maximum cost of a collect call is allowed.

For example, an exemplary set of rules may include at least the following:
- A. My family members can call me by collect call at any time.
- B. My priority customers can call me by collect call at any time on weekdays and daytime on weekends.
- C. My normal customers can call me by collect call at work hours on weekdays.
- D. My special-interest circle members can call me by collect call after work on weekdays and anytime on weekends.

For example, the defined rule 122 may be an authorization rule set (ARS), which is a set of authorization rules or an authorization rule (AR), which includes Name (N), Membership (M), and Call Scenario Set (CSS).

A Call Scenario Set (CSS) includes Date (D), Time (T), Caller's Endpoints (Caller), Callee's Endpoints (Callee), Call Initiation Type (CIT), Dial Type (DT), Maximum Duration (MD), and Maximum Cost (MC).

For instance, the following is an example of an authorization rule.

```
N=Family
M={Dad-LiveID@hotmail.com, Mom-LiveID@hotmail.com, son-phone-
number, daughter-phone-number}
CSS={
  { D=ANY, T=ANY, Caller=ANY, Callee=ANY, CIT=ANY,
DT=ANY, MD=ANY, MC=ANY }
}
N=Priority-Customers
M={C1-LiveID@hotmail.com, C2-LiveID@hotmail.com, C3-phone-
number, C4-phone-number}
CSS={
  { D=Weekdays, T=ANY, Caller={VoIP}, Callee={Landline, VoIP},
CIT={PSTN-Out-In, PSTN-Out, PSTN-In, 3PCC}, DT={Domestic,
International},
MD=(<= 1 hour), MC=(<= $10 USD)
  },
  { D=Weekdays, T=ANY, Caller={Landline, Mobile}, Callee=
{Landline, VoIP},
CIT={PSTN-In, 3PCC}, DT={Domestic}, MD=(<= 1 hour),
MC=(<= $10 USD)
  },
  { D=Weekdays, T={after work}, Caller=ANY, Callee={Voicemail},
CIT=ANY, DT={Domestic},
MD=(<= 1 hour), MC=(<= $10 USD)
  },
  { D=Weekdays, T=ANY, Caller=ANY, Callee=ANY, CIT=ANY,
DT={Domestic},
MD=(<= 1 hour), MC=(<= $10 USD)
  },
}
```

The output of executing an authorization rule is an authorization result triplet:

```
<Yes/No for collect call, Maximum Duration of collect call,
Maximum Cost of collect call>.
```

The final authorization result is created by merging all of the authorization result triplets. The merge is to allow the maximum benefit of collect call to the caller because the spirit of collect call benefits the caller.

When there are N rules, it requires N−1 merges. For instance, if there are 8 rules, the merges can happen in the following way.

<R1, R2>, <R3, R4>, <R5, R6>, <R7, R8>
<R12, R34>, <R56, R78>
<R1234, R5678>

There are totally 7 merges.
Another possible way of merging is
<R1, R2>
<R12, R3>
<R123, R4>
<R1234, R5>
<R12345, R6>
<R123456, R7>
<R1234567, R8>

This also requires 7 merges.

It can be proved that it requires N−1 merges for N rules.

In one embodiment, the processor 102 executes computer-executable instructions embodied in computer executable components, applications, or engines. When a call is coming in, in one example, a rules engine starts to execute all authorization rules for each possible destination 118 of the user 110. For each pair of this incoming call and a possible destination 118 of the user 110, the execution of an authorization rule produces an authorization result triplet. All these produced authorization result triplets will be merged into the final authorization result.

For each approved endpoint, there is a final authorization result that determines acceptance of collect call, maximum duration of collect call, and maximum cost of collect call for this destination.

The final output of the rules engine may be a set of duplets, consisting of an approved destination 118 of the user 110 and the final authorization result for this endpoint.

The call router will then try to reach the user 110 through approved destinations 118 of the user 110 simultaneously or one by one, depending on the calling plan the callee has.

Table 1 illustrates an exemplary list of destinations:

TABLE 1

| Caller (calling party) | Callee (called party) | Call Initiation Type |
|---|---|---|
| VoIP device | VoIP device | PSTN Out/In, 3PCC |
| VoIP device | Landline phone | PSTN Out, 3PCC |
| VoIP device | Mobile phone | PSTN Out, 3PCC |
| VoIP device | Voicemail | PSTN Out, PSTN Out/In, 3PCC |
| Landline phone | VoIP device | PSTN In, 3PCC |
| Landline phone | Landline phone | 3PCC |
| Landline phone | Mobile phone | 3PCC |
| Landline phone | Voicemail | PSTN In, 3PCC |
| Mobile phone | VoIP device | PSTN In, 3PCC |
| Mobile phone | Landline phone | 3PCC |
| Mobile phone | Mobile phone | 3PCC |
| Mobile phone | Voicemail | PSTN In, 3PCC |

TABLE 2

| VoIP devices | |
|---|---|
| Call Initiation Type | Description |
| PSTN Out | VoIP call from a VoIP device to a landline/mobile phone |
| PSTN In | VoIP call from a landline/mobile phone to a VoIP device |
| PSTN Out/In | VoIP call from a VoIP device to another VoIP device, as well as a super set of PSTN Out and PSTN In |

TABLE 2-continued

VoIP devices

| Call Initiation Type | Description |
|---|---|
| 3PCC (Third Party Call Control) | VoIP call initiated through the 3PCC mechanism from a VoIP device or landline/mobile phone to another VoIP device or landline/mobile phone |

Figure 2:
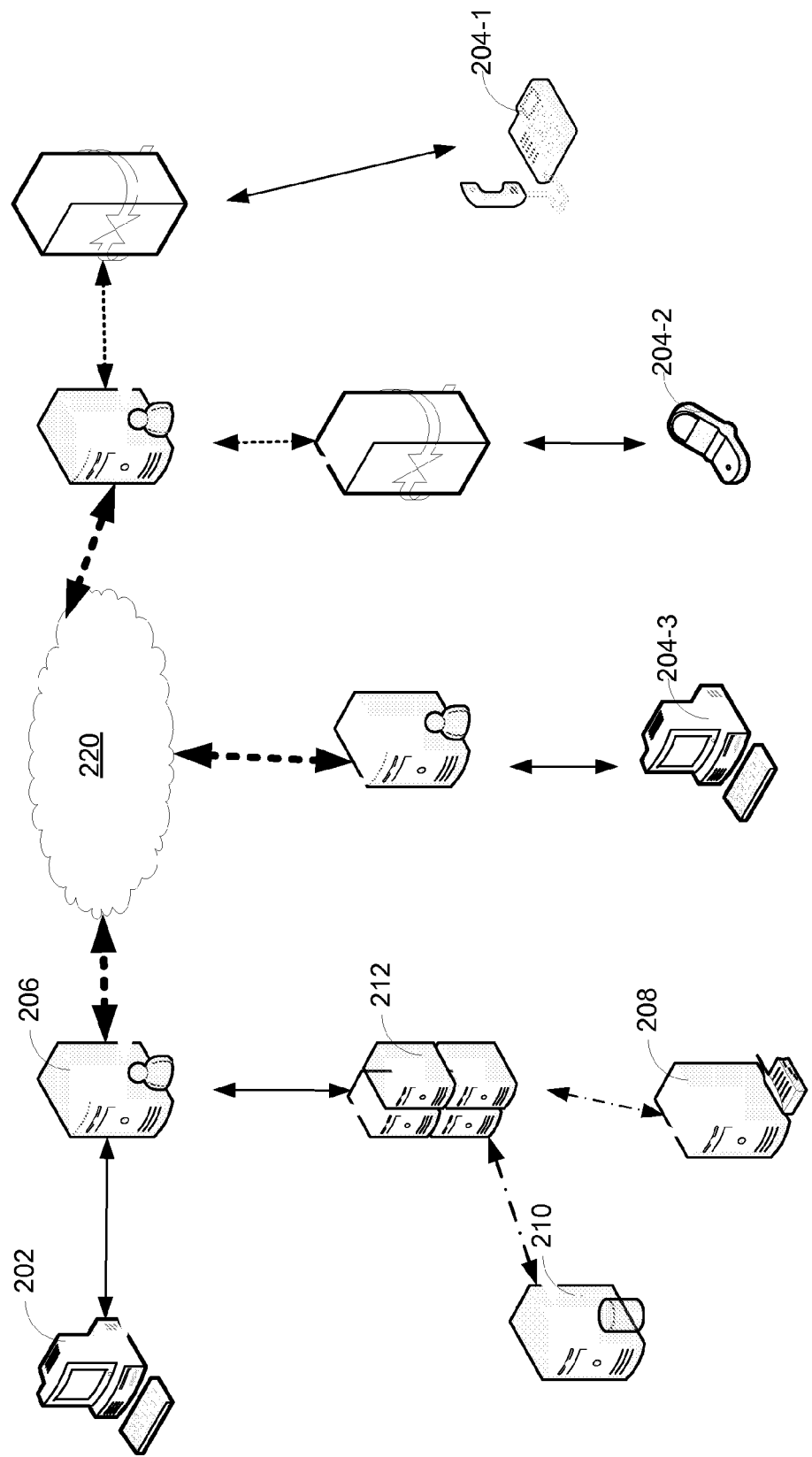
FIG. 2 is a block diagram illustrating an exemplary implementation of a voice over Internet Protocol (VoIP) environment according to an embodiment of the invention.

Referring now to FIG. 2, a diagram illustrates a VoIP architecture for selective pre-authorized credit for incoming calls according to an embodiment of the invention. The diagram illustrates the VoIP call originated from a softphone 202 and terminated at either a landline phone (through PSTN Gateway) 204-1, a mobile phone (through Mobile Gateway) 204-2, or a VoIP phone (through another or same SIP proxy) 204-3. A VoIP Phone can be a softphone, a WiFi phone, or a dual-mode phone.

In one embodiment, a SIP Proxy (SP) 206 is the proxy server that routes all VoIP calls to terminal endpoints.

Account Database (AD) 208 is the database that stores the information of all user accounts.

Rules Database (RD) 210 is the database that stores all the authorization rules.

Rules Engine (RE) 212 is the inference engine that takes the call parameters from SIP Proxy A 206 and the account information from Account Database to infer on the callee's auto-authorized rules. These servers or databases are interacted via a network 220.

In one embodiment, aspects of the invention may be illustrated according to FIG. 3. In one example, FIG. 3 illustrates a flow diagram describing operations of selectively issuing a pre-authorized credit to an incoming call from a caller (e.g., caller 112) to a user (e.g., user 110) according to an embodiment of the invention. At 302, one or more source identifications (IDs) are identified for receiving pre-authorized credit for the incoming call, said incoming call being a voice over internet protocol (VoIP) call. One or more destinations are specified to receive the incoming call at 304. At 306, a rule is defined associated with the one or more destinations and the one or more source IDs. For example, the defined rule may include one or more parameters illustrated previously in the specification. At 308, the incoming call (e.g., call 114) directed to one of the destinations is received from a caller.

At 310, it is determined whether the incoming call and the caller satisfy the defined rule as a function of the one of the destinations, one or more identified source IDs and the defined rule. If it is determined that the incoming call satisfies the rule, the pre-authorized credit is issued for the incoming call from the caller at 312. That is, the caller 112 will receive a credit for calling the user 110 so that the incoming call 114 is a free phone call. At 314, the incoming call from the caller is routed to the user 110, and the caller 112 establishes a connection with the user without being charged for the incoming call 114. On the other hand, if the determination at 310 is negative, aspects of the invention may recursively identify another destination ID at 316. In other words, aspects of the invention may identify another destination of the user 110 that may satisfy the defined rule.

In one alternative embodiment, the system 100 may provide a notification to the caller if it is determined that the incoming call does not satisfy the defined rule to receive the issued pre-authorized credit for the incoming call. The notification may further prompt the caller for further instructions to proceed to complete or connect the call to the user 110. In another embodiment, where the source ID is not readily identifiable, the system 100 may prompt the caller 112 to enter authentication credentials that were given to the caller 112 by the user 110 for the purpose of receive the issued pre-authorized credit.

In operation, an exemplary implementation of aspects of the invention may be further explained below using FIG. 2:

1. When a caller makes a VoIP call, the call request will arrive at SIP Proxy A.
2. SIP Proxy A will consult with Rules Engine for possible call to receive a pre-authorized credit by sending the call request to Rules Engine.
3. Upon receiving the call request, Rules Engine retrieves the account information from Account Database and retrieves the rules from Rules Database.
4. Rules Engine infers on the rules and generates authorization results and merge the results into the final result.
5. Rules Engine authorizes or denies this call by issuing the pre-authorized credit and sends the authorization response back to SIP Proxy A.
6. When SIP Proxy A receives the authorization response and routes the call to the approved phone endpoints for the call with the pre-authorized credit.
7. If the callee/user picks up the call at the approved phone endpoints, then the call session is established.
8. Otherwise, SIP Proxy A routes the call to the other available phone endpoints (but the call may not be a call with the pre-authorized credit, i.e., the call is not a toll-free call).
9. After the call is established, SIP Proxy A may warn both caller and callee of terminating the call due to exceeding the maximum time duration or cost, and shortly after, SIP Proxy A will terminate the call.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Embodiments of the invention may be implemented with computer-executable instructions. The computer-executable instructions may be organized into one or more computer-executable components or modules. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A method of selectively issuing pre-authorized credit from a user to an incoming call, said method comprising:
    identifying one or more source identifications (IDs) for receiving pre-authorized credit for the incoming call, said incoming call being a voice over internet protocol (VoIP) call;
    specifying one or more destinations to receive the incoming call;
    defining a rule associated with the one or more destinations and the one or more source IDs;
    receiving the incoming call directed to one of the destinations from a caller;
    evaluating the incoming call and the caller as a function of the one of the destinations, one or more identified source IDs and the defined rule;
    notifying the caller if evaluating indicates that the incoming call does not satisfy the defined rule to receive the issued pre-authorized credit for the incoming call;
    issuing the pre-authorized credit for the incoming call from the caller if the evaluating indicates that the incoming call to the destination satisfies the defined rule; and
    routing the incoming call from the caller to the user, wherein the caller establishes a connection with the user without being charged for the incoming call.

2. The method of claim 1, further comprising providing a suggestion to re-direct the incoming call to another destination in the one or more destinations, and wherein evaluating comprises evaluating the incoming call and the caller as a function of the one or more identified source IDs, the defined rule, and the another destination.

3. The method of claim 1, further comprising verifying a source ID from the incoming call prior to said evaluating the incoming call.

4. The method of claim 3, further comprising prompting the caller to identify at least one of the following if the identified source ID is not understood: a source ID or an authentication credential for the pre-authorized credit.

5. The method of claim 1, wherein the defining comprises defining a rule having at least one of the following parameters: a name of the rule, a membership of the rule identifying a source of the call, and a call scenario set.

6. The method of claim 5, wherein the call scenario set comprises at least one of the following: a date, a time, a caller's source ID, a user's destination, a call initiation type, a dial type, a maximum duration, and a maximum cost.

7. A method of selectively issuing pre-authorized credit from a user to an incoming call, said method comprising:
    identifying one or more source identifications (IDs) for receiving pre-authorized credit for the incoming call, said one or more source IDs including at least one of the following: a telephone caller ID, a telephone number, an electronic mail (e-mail) address, an online identification, and an authentication credential identifying a caller;
    specifying one or more destinations to receive the incoming call;
    defining a rule associated with the one or more destinations and the one or more source IDs;
    receiving the incoming call directed to one of the destinations from a caller;
    evaluating the incoming call and the caller as a function of the one of the destinations, one or more identified source IDs and the defined rule;
    providing a suggestion to re-direct the incoming call to another destination in the one or more destinations if the evaluating indicates the incoming call does not satisfy the defined rule;
    issuing the pre-authorized credit for the incoming call from the caller if the evaluating indicates that the incoming call to the destination satisfies the defined rule; and
    routing the incoming call from the caller to the user, without the user being charged for the incoming call.

8. The method of claim 7, further comprising providing a notification to the caller if it is determined that the incoming call does not satisfy the defined rule to receive the issued pre-authorized credit for the incoming call.

9. The method of claim 7, wherein evaluating comprises evaluating the incoming call and the caller as a function of the one or more identified source IDs, the defined rule, and the another destination.

10. The method of claim 7, further comprising identifying a source ID from the incoming call prior to said evaluating.

11. The method of claim 10, further comprising prompting the caller to identify at least one of the following if the identified source ID is not understood: a source ID or an authentication credential for the pre-authorized credit.

12. The method of claim 7, wherein the defining comprises defining a rule having at least one of the following parameters: a name of the rule, a membership of the rule identifying a source of the call, and a call scenario set.

13. The method of claim 12, wherein the call scenario set comprises conditional statements associated with at least one of the following information: a date, a time, a caller's source ID, a user's destination, a call initiation type, a dial type, a maximum duration, and a maximum cost.

14. The method of claim 7, further comprising merging a plurality of the associated rules to create an authorization rule, wherein merging comprises combining a set of N rules at least N−1 times to create the authorization result.

15. A system for establishing a connection from a caller to a user using a pre-authorized credit from the user, said system comprising:
    a processor configured to execute computer-executable instructions for:
        identifying one or more source identifications (IDs) for receiving pre-authorized credit for the incoming call;
        specifying one or more destinations to receive the incoming call;
        defining a rule associated with the one or more destinations and the one or more source IDs;
    an interface for receiving the incoming call directed to one of the destinations from a caller;
    a storage area for storing the defined rule;
    wherein the processor is configured to:
        identifying a source ID from the incoming call;
        evaluate the incoming call and the caller as a function of the one of the destinations, one or more identified source IDs and the defined rule;
        execute a plurality of rules;
        notify the caller if evaluating indicates that the incoming call does not satisfy the defined rule to receive the issued pre-authorized credit for the incoming call;
        issue the pre-authorized credit for the incoming call from the caller if it is determined that the incoming call to the destination satisfies the defined rule; and
        route the incoming call from the caller to the user, wherein the caller establishes a connection with the user without being charged for the incoming call.

16. The system of claim 15, wherein the processor is further configured to provide a suggestion to recursively re-direct the incoming call to another destination in the one or more destinations, and wherein evaluating comprises evaluating the incoming call and the caller as a function of the one or more identified source IDs, the defined rule, and the another destination.

17. The system of claim 15, wherein the processor is further configured to prompt the caller to identify at least one of the following if the identified source ID is not understood: a source ID or an authentication credential for the pre-authorized credit.

18. The system of claim 15, wherein the processor is further configured to define the rule having at least one of the following parameters: a name of the rule, a membership of the rule identifying a source of the call, and a call scenario set.

19. The system of claim 18, wherein the call scenario set comprises conditional statements associated with at least one of the following information: a date, a time, a caller's source ID, a user's destination, a call initiation type, a dial type, a maximum duration, and a maximum cost.

* * * * *